2,868,760

METHACRYLATE RESIN COMPOSITION AND METHOD OF MAKING SAME

Dimitrios N. Staicopoulos, Drexel Hill, Pa., assignor to E. I. du Pont de Nemours and Company, Wilmington, Del., a corporation of Delaware No Drawing. Application December 20, 1956
Serial No. 629,454

7 Claims. (Cl. 260—41)

This invention relates to coating compositions and film-forming polymers used therein. More particularly, it relates to coating compositions based on certain polymers of methyl methacrylate as essential film-forming constituents.

Polymers of methyl methacrylate have heretofore been suggested for use as film-formers in coating compositions. One troublesome characteristic of such coating compositions in general is that dry coatings obtained therefrom lack craze-resistance when contacted with solvent materials as occurs, for example, when a touch-up or refinish paint is applied thereover. As a result, such touch-up or refinish paint job leaves a generally unattractive surface.

Another shortcoming of coating compositions based on methyl methacrylate polymers has been the inability heretofore to obtain jet black coatings. It has, of course, been possible to make black coatings but regardless of the nature of the pigment, such coatings have not had the jetness obtainable with most film-forming materials conventionally used in coating compositions. Putting it another way, the black coatings have not been black enough to compete with coating compositions based on other film-formers.

I have discovered how to make coating compositions based on polymers of methyl methacrylate as essential film-formers that are novel and not only have outstanding craze-resistance but which additionally can be pigmented to give any desired color coat including jet black.

The polymers used in the coating compositions of my invention are copolymers of methyl methacrylate with glycidyl methacrylate in which the methyl methacrylate to glycidyl methacrylate weight ratio is from 80:20 to 98:2 (i. e., 80 to 98% methyl methacrylate and 20 to 2% glycidyl methacrylate). The preferred polymers are those having a relative viscosity in the range of 1.117 to 1.196. Polymers outside said range have valuable properties and can be used in making coating compositions provided, of course, that the degree of polymerization is not so high that the polymer is rendered insoluble in solvents of the kind used in making coating compositions.

Still further, the preparation of the liquid coating compositions of the invention is characterized by including with the methyl methacrylate copolymer in a solvent medium an alkyl acid phosphate and a saturated aliphatic dicarboxylic acid having from 5 to 20 carbon atoms in which the carboxyl groups are separated by a chain of at least 3 carbon atoms. The amounts of these latter components are adjusted so that the mole ratio of the phosphate to the dicarboxylic acid is from 75:25 to 10:90 and the total or sum of the phosphate and dicarboxylic acid input comes to about from 0.5 to 1.0 mole per mole of glycidyl methacrylate in the methyl methacrylate copolymer.

The methyl methacrylate copolymer used in making the coating compositions of the invention can be prepared according to well-known techniques for polymerizing methyl methacrylate monomer with another monomer copolymerizable therewith, either in bulk, in solution, or in granular form to produce products having the required relative viscosity. The preferred weight ratios of methyl methacrylate to glycidyl methacrylate used are 85:15 to 95:5 although the somewhat wider ratios of 80:20 to 98:2 are operable as indicated above. Coating compositions made from methyl methacrylate copolymers having ratios higher than 98:2 provide coatings prone to crazing and those having ratios below 80:20 have other undesirable properties, for example, they are brittle and easily chipped, and cannot be satisfactorily patched or touched-up.

The term "relative viscosity," as used herein, means the number obtained by dividing the efflux time of a solution A of the methyl methacrylate copolymer by the efflux time of the solvent B used in said solution, the efflux times being measured in accordance with the procedure of A. S. T. M. D–445–46–T, Method B, using as polymer solution A, a solution of 0.25 gram of the methyl methacrylate copolymer being tested in 50 cc. of ethylene dichloride and as the solvent B, ethylene dichloride. The efflux times are determined at 25° C. in a standard apparatus currently marketed under the designation of a modified Ostwald Viscosimeter, Series 50.

The phosphates suitable for use in making the coating compositions of the invention are alkyl acid phosphates. In other words, they are mono- or dihydric phosphates such, for example, as are represented by the formulas $R_2HPO_4$, $RH_2PO_4$, and $R_2H_2P_2O_7$, where R is alkyl. Preferably, the alkyl group is one containing from 4 to 18 carbon atoms. Illustrative of alkyl acid phosphates that can be used are dibutyl-ortho-phosphate, monobutyl-ortho-phosphate, dibutyl-pyro-phosphate, monooctodecyl-ortho-phosphate, dihexyl-ortho-phosphate, monooctyl-ortho-phosphate and didodecyl-ortho-phosphate. The alkyl group of the acid phosphate can be straight or branched chain. Mixtures of such alkyl acid phosphates can be used.

The dicarboxylic acid component used in making the coating compositions of the invention is a saturated aliphatic dicarboxylic acid having from 5 to 20 carbon atoms that is further characterized by having the carboxyl groups separated by a chain of at least 3 carbon atoms. In other words, the dicarboxylic acid is one represented by the formula HOOCRCOOH in which R is a divalent saturated aliphatic radical containing 3 to 18 carbon atoms, straight or branched chain, linking the carboxyl groups thru a chain of at least 3 carbon atoms. Preferably, the dicarboxylic acid is a straight chain alkane alpha-omega-dicarboxylic acid or alkanedioic acid having from 6 to 12 carbon atoms, i. e., a compound represented by the formula $HOOCCH_2(CH_2)_nCH_2COOH$ where $n$ is an integer from 2 to 8 inclusive. Illustrative of dicarboxylic acids useful in making coating compositions of the invention are adipic, pimelic, suberic, azelaic, sebacic, hendecanedioic, dodecanedioic, glutaric, brassylic, thapsic, eicosanedioic, alpha-butyl-alpha-ethyl-glutaric and beta-isopropylazelaic.

While the use of both an alkyl acid phosphate and a saturated aliphatic dicarboxylic acid is necessary in preparing coating compositions of the invention, the relative amounts of such components used can be varied as indicated heretofore within alkyl acid phosphate:aliphatic dicarboxylic acid mole ratios of from 75:25 to 10:90, in other words, within the range of from about 3 moles of the acid phosphate for each mole of the dicarboxylic acid to 1 mole of the acid phosphate for each 9 moles of the dicarboxylic acid. Additionally, the amount of the acid phosphate and the dicarboxylic acid used is regulated so that the sum of the moles of the acid phosphate and the moles of the dicarboxylic acid totals from about 0.5 to 1.0 moles per mole of glycidyl methacrylate in the methyl methacrylate copolymer.

Thus the film-forming resin compositions of the invention used in making the liquid coating compositions of the invention comprise the three essential components described above, namely the methyl methacrylate copolymer, the alkyl acid phosphate, and the aliphatic dicarboxylic acid, with or without the presence of solvent. Of course, the liquid coating compositions of the invention will contain, in addition to the methyl methacrylate copolymer, the alkyl acid phosphate and the aliphatic dicarboxylic acid components described above, other materials which are conventionally used in making lacquers such as a solvent and, unless a clear coating is desired, a pigment; and they can also contain conventional modifiers for coating compositions such as plasticizers, inhibitors, dispersing agents, flow-control agents, and the like.

The various ingredients of the coating compositions of the invention can be brought together in accordance with conventional lacquer formulating techniques in any desired manner to form the finished coating compositions. Preferably, however, in order to obtain maximum storage stability of the coating compositions (i. e., freedom from rapid settling, flocculation, or gelling), and especially where it is desired to use the compositions to obtain jet black coatings, the several essential components, namely, the copolymer, the phosphate, and the dicarboxylic acid, are first premixed in a suitable solvent and heat treated before blending with the other components. The degree of heat treatment can be varied widely but in general for optimum results, particularly in the preparation of black coating compositions, it will be found desirable to heat the said essential ingredients in a solvent at from 50° to 100° C. for 10 to 20 hours. Such operation is carried out conveniently by selecting a solvent that will boil in said temperature range, for example, methyl ethyl ketone, and then simply heating at reflux temperature.

Examples of the great variety of pigments which can be used in making the coating compositions of this invention are titanium dioxide, carbon black, silica, china clay, talc, metallic oxides, silicates, chromates, sulfides, sulfates, and organic pigments. Pigments that are particularly acid sensitive are, of course, to be avoided. Pigments are included in proportions normally used in coating compositions.

Examples of the volatile solvents and diluents which can be used in formulating the liquid coating compositions are toluene, xylene, butyl acetate, acetone, methyl isobutyl ketone, butyl ether, and other aliphatic cycloaliphatic and aromatic hydrocarbons, esters, ethers, ketones, and alcohols such as are conventionally used in coating compositions.

In addition to the methyl methacrylate copolymer component, other organic film-forming materials compatible therewith can be included in the coating compositions such as poly(methyl methacrylate) and similar polymerized esters of acrylic and methacrylic acid, oil modified alkyd resins, alkylated amino-aldehyde resins, and phenol aldehyde resins.

Any of the plasticizers for polymers of methyl methacrylate can be used in the coating compositions. The preferred plasticizer from the standpoint of best overall balance of properties is benzyl butyl phthalate. Other plasticizers which aid in providing dry films having especially desirable properties are dibutyl phthalate, triphenyl phosphate, 2-ethylhexylbenzyl phthalate and dicyclohexyl phthalate.

The coating compositions of this invention are especially useful for application to obtain topcoats having outstanding outdoor durability and thus are particularly useful in providing decorative topcoats on steel automobile bodies. For such usage, the coating compositions are preferably applied over previously applied coatings such as primers and undercoats and are then dried. The topcoat can be air dried at room temperature, force dried for example for 30 minutes at 200° F., or subjected to mild baking conditions, for example at 375° F. for 10 minutes, but it will be apparent that other times and temperatures can be used.

The coating compositions of this invention can be used, if desired, directly on a bare substrate or under subsequently applied coatings. Also they can be used on substrates other than steel which are not adversely affected by the baking operations including glass, ceramics, asbestos, wood (when moderate baking conditions are permissible) and metals such as aluminum, copper, magnesium, and alloys thereof.

In order that the invention may be better understood, the following examples illustrating coating compositions of the invention, their preparation and use, are given in addition to the examples already given above.

EXAMPLE 1

*Preparation of methyl methacrylate copolymer*

A copolymer having a methyl methacrylate to glycidyl methacrylate weight ratio of 95:5 is prepared by bringing together the ingredients tabulated below in the amounts shown at room temperature and then heating the resulting mix to 212° F. at a rate of 2° to 5° F. per minute, and then holding at 210° to 214° F. for 2 hours.

| | Parts by weight |
|---|---|
| Methyl methacrylate monomer | 3084 |
| Glycidyl methacrylate monomer | 163 |
| Acetone | 1136 |
| Toluene | 487 |
| Benzoyl peroxide | 26 |

The copolymer so produced has a relative viscosity, determined as described hereinabove, of about 1.14. A sample of the copolymer for use in determining the relative viscosity is obtained by evaporating the solvent from the polymer solution prepared as above.

The polymer solution prepared as above is diluted with a mixture of 9 parts by weight of toluene to 1 part by weight of acetone to give a solution containing 41% by weight of the polymer for use as described below.

*Preparation of the coating composition*

To 1140 parts by weight of the 41% solids copolymer solution prepared as above, there is added 2.8 parts by weight of monobutyl-ortho-phosphate, 16.5 parts by weight of azelaic acid, and 785 parts by weight of methylethyl ketone. These amounts correspond to an acid phosphate to dicarboxylic acid mole ratio of 18.8:81.2 and a mole ratio of total acids (i. e., acid phosphate plus dicarboxylic acid) to glycidyl methacrylate in the copolymer of 0.66:1. The resulting solution containing about 25% solids is heated at 78°–84° C. (reflux conditions) for 14.5 hours, and, after cooling, is thoroughly mixed with pigment, plasticizer, and thinner according to the following formulation.

| | Parts by weight |
|---|---|
| Copolymer-acid solution | 256 |
| Benzylbutyl phthalate (plasticizer) | 18.5 |
| Solvent mixture | 207.5 |
| Black pigment mill base | 118 |

The black pigment mill base used in the above formula is prepared by grinding in a rubber mill a mixture of 5 parts by weight of carbon black pigment (NeoSprectra Mark II, a product of Columbian Carbon Company), 10 parts by weight of benzylbutyl phthalate plasticizer, and 7.5 parts by weight of one-half second viscosity nitrocellulose, and the milled mix is dissolved in ethyl acetate to give 22.5% by weight of the mix in the ethyl acetate.

The solvent mixture used in the above formula consists of a mixture of toluene, methylethyl ketone, xylene, and "Cellosolve" acetate (methoxyethyl acetate).

*Preparation of coated article*

The liquid coating composition prepared as above is applied by spraying, after diluting with a thinner to about 17.5% solids, to auto body steel panels which previously have been treated with a conventional rust inhibitor ("Bonderite," a product of Parker Rust-Proof Co.), prime coated with a conventional primer containing about 52% by weight soya oil modified glycerol phthalate resin as the film-former and baked for 15 minutes at 400° F. to give a dry coating about 0.5 mil thick, and undercoating with the composition of Example 1 of copending application Serial No. 434,665 of Ronald J. Sheppard, filed June 4, 1954, now abandoned. More specifically, the undercoat composition is one containing as the film-forming material in lacquer solvents 34% by weight lacquer-grade nitrocellulose, 49% shellac, and 17% polyvinyl butyraldehyde resin ("Butvar" B-90, a product of Monsanto Chemical Co.), and pigment in amount corresponding to 28.5% by weight of the total organic film-forming material.

The liquid composition of this example is applied as the topcoat to give a film which, when dried at 200° F. for thirty minutes, is about 2.5 mils thick. The resulting coating is smooth, uniform, hard, glossy, and jet black.

*Evaluation of the coated article*

The black finished panels coated as described above have as desirable an appearance and jetness as panels having a conventional topcoat of a standard black nitrocellulose lacquer sold by E. I. du Pont de Nemours and Company under the proprietary name of "Duco" for use in finishing steel automobile bodies. The topcoats of this invention are extremely durable and resistant to weathering as is demonstrated by exposure of the panels of this example to extended outdoor exposure in Florida. Resistance of the topcoat to solvent cracking is illustrated by the failure of cracking to develop upon applying to the coated panels a refinish coat of the liquid topcoat composition of this example.

EXAMPLE 2

A lacquer is made by intimate mixing of the following ingredients in the amounts shown:

| | Parts by weight |
|---|---|
| 41% solution of 95/5 methyl methacrylate/glycidyl methacrylate copolymer (same as described in Example 1) | 146 |
| Benzylbutyl phthalate | 22.5 |
| Monostearyl-ortho-phosphate | 4.75 |
| Adipic acid | 0.66 |
| Black pigment mill base (same as in Example 1) | 118 |
| Solvent (as in Example 1) | 315.5 |

In the lacquer formulation of this example, the mole ratio of acid phosphate to dicarboxylic acid is 75:25 and the mole ratio of total acid to glycidyl methacrylate in the copolymer is 0.86:1. The process of preparing the lacquer differs from that described in Example 1 by omission of the pre-heat treatment of the copolymer with the acid phosphate and dicarboxylic acid.

The lacquer of this example contains about 17.5% solids and is particularly adapted for spray application soon after the formulation has been completed but is not recommended where the lacquer is to remain in storage before use.

EXAMPLE 3

The composition of this example is a white lacquer formulated from the following ingredients in the amounts shown. The methyl methacrylate copolymer solution referred to is one prepared as in Example 1 from a 95/5 methyl methacrylate/glycidyl methacrylate copolymer modified by heat treatment with monobutyl-ortho-phosphate and azelaic acid. The acid phosphate and azelaic acid are used in a mole ratio of 18.5:81.5 and the sum of said acid components amounts to 0.66 mole per mole of glycidyl methcrylate in the copolymer.

| | Parts by weight |
|---|---|
| Methyl methacrylate copolymer solution (25.5% solids) | 845 |
| Benzylbutyl phthalate | 85.5 |
| Titanium dioxide | 150 |
| Solvent (as in Example 1) | 1419.5 |

The lacquer of this example contains 18% solids and is in the form suitable for spray application to provide a decorative, high gloss, craze-resistant, durable topcoat.

EXAMPLE 4

A black lacquer is made by intimate mixing of the following ingredients:

| | Parts by weight |
|---|---|
| 39% solution of 80/20 methyl methacrylate/glycidyl methacrylate copolymer | 90.0 |
| Monooctyl-ortho-phosphate | 4.25 |
| Icosane dicarboxylic acid | 2.3 |
| Benzylbutyl phosphate (plasticizer) | 2.0 |
| Black pigment mill base (as in Example 1) | 54.24 |
| Methylethyl ketone | 113.0 |
| Glycol monoacetate | 28.5 |

The methyl methacrylate copolymer used in the above formulation is prepared according to the process described in Example 1 for preparation of such copolymers except that the weight ratio of methyl methacrylate monomer to glycidyl methacrylate monomer is changed to 80:20. The mole ratio of phosphate to dicarboxylic acid used in the lacquer of this example is 75:25 and the mole ratio of total acid to glycidyl methacrylate is 0.55:1. The lacquer of this example contains about 18% solids and is suitable as is for spray application.

EXAMPLE 5

A lacquer containing a methyl methacrylate copolymer having a methyl methacrylate monomer to glycidyl methacrylate monomer weight ratio of 80:20, an acid phosphate to dicarboxylic acid mole ratio of 10:90, and a total acid to glycidyl methacrylate mole ratio of 0.73:1, is made by intimately mixing the following components:

| | Parts by weight |
|---|---|
| 43.3% solution of 80/20 methyl methacrylate/glycidyl methacrylate copolymer | 72.0 |
| Azelaic acid | 5.4 |
| Monobutyl-ortho-phosphate | 0.49 |
| Benzylbutyl phthalate | 9.5 |
| Carbon black pigment mill base (19.2% solids) | 61.0 |
| Solvent (as in Example 1) | 145.0 |

EXAMPLE 6

This example illustrates a lacquer which contains as a film-former in addition to the methyl methacrylate/glycidyl methacrylate copolymer a methyl methacrylate/methyl acrylate copolymer containing 70 parts by weight of methyl methacrylate for each 30 parts by weight of methyl acrylate. The mole ratio of phosphate to dicarboxylic acid used is 50:50 and the mole ratio of total acid to glycidyl methacrylate used is 0.85:1. The lacquer is made by intimate mixing of the following ingredients in the amounts shown:

| | Parts by weight |
|---|---|
| 39% solution of 80/20 methyl methacrylate/glycidyl methacrylate copolymer | 36.7 |
| 39% solution of 70/30 methyl methacrylate methyl acrylate copolymer | 36.7 |
| Monooctyl-ortho-phosphate | 1.81 |
| Azelaic acid | 1.61 |
| Benzylbutyl phthalate (plasticizer) | 5.0 |
| Carbon black mill base (20.2% solids) | 58.0 |
| "Cellosolve" acetate | 30.0 |
| Methylethyl ketone | 119.0 |

The lacquer of this example contains about 18% solids,

It is particularly adapted for immediate spray application.

EXAMPLE 7

The methyl methacrylate copolymer solution used in preparing the lacquer of this example is one containing 27.7% solids and is prepared by heating the copolymer in solution with the phosphate and dicarboxylic acid components according to the method described in Example 1. The copolymer used has a methyl methacrylate:glycidyl methacrylate weight ratio of 95:5. The phosphate used is monobutyl-orthophosphate, the dicarboxylic acid is sebacic acid, and the phosphate:dicarboxylic acid mole ratio is 35:65. The mole ratio of total acid to glycidyl methacrylate is 1:1.

| | Parts by weight |
|---|---|
| Methyl methacrylate copolymer solution | 445 |
| Benzylbutyl phthalate | 42 |
| Carbon black pigment mill base (22.1% solids) | 204 |
| Thinner (as in Example 1) | 509 |

The lacquer of this example contains 17.5% solids and is in a form suitable for spray application. It has outstanding storage stability and is especially useful for use in providing a high gloss, jet black, craze-resistant, durable topcoat on automobile bodies.

EXAMPLE 8

Another black lacquer having performance characteristics similar to those of the lacquer of Example 7 is made by a process like that used in Example 7 except that the methyl methacrylate:glycidyl methacrylate weight ratio of the copolymer is 90:10, azelaic acid is used instead of sebacic acid as the dicarboxylic acid, the mole ratio of monobutyl-ortho-phosphate to azelaic acid is 19:81 and the mole ratio of total acid to glycidyl methacrylate is 0.65:1. The methyl methacrylate copolymer has a relative viscosity of 1.149. More specifically, the formula is:

| | Parts by weight |
|---|---|
| Methyl methacrylate copolymer solution (25% solids) | 256.0 |
| Benzylbutyl phthalate | 18.5 |
| Carbon black pigment mill base (as in Example 7) | 101.5 |
| Thinner (as in Example 1) | 250.0 |

The foregoing examples illustrate a wide variety of specific embodiments of this invention. The use of equivalent ingredients in other embodiments will be obvious, in the light of the teachings made herein, to persons skilled in the copolymer and coating composition arts.

I claim:

1. A liquid coating composition comprising (A) a copolymer of methyl methacrylate and glycidyl methacrylate having a methyl methacrylate:glycidyl methacrylate weight ratio of from 80 : 20 to 98 : 2, and a solvent for said copolymer, (B) a phosphate from the group consisting of monohydric and dihydric alkyl phosphates and (C) a saturated aliphatic dicarboxylic acid having from 5 to 20 carbon atoms in which the carboxyl groups are separated by a chain of at least three carbon atoms, the mole ratio of (B) to (C) being from 75 : 25 to 10 : 90 and the total of (B) and (C) amounting to from about 0.5 to 1.0 moles per mole of glycidal methacrylate in (A).

2. A liquid coating composition comprising (A) a copolymer of methyl methacrylate and glycidyl methacrylate having a methyl methacrylate:glycidyl methacrylate weight ratio of from 85 : 15 to 95 : 5 and a relative viscosity of 1.117 to 1.196, and a solvent for said copolymer (B) a phosphate from the group consisting of monohydric and dihydric alkyl phosphates in which the alkyl group contains from 4 to 18 carbon atoms, and (C) an alkanedioic acid having from 6 to 12 carbon atoms, the mole ratio of (B) to (C) being from 75 : 25 to 10 : 90 and the total of (B) and (C) amounting to from about 0.5 to 1.0 moles per mole of glycidyl methacrylate in (A).

3. A liquid coating composition comprising a pigment and as an essential film-forming component a composition consisting essentially of (A) a copolymer of methyl methacrylate and glycidyl methacrylate having a methyl methacrylate:glycidyl methacrylate weight ratio of 85 : 15 to 95 : 5 and a relative viscosity of 1.117 to 1.196 modified by heating with (B) a phosphate from the group consisting of monohydric and dihydric alkyl phosphates in which the alkyl group contains from 4 to 18 carbon atoms and (C) an alkanedioic acid having from 6 to 12 carbon atoms, and a solvent for said copolymer, the mole ratio of (B) to (C) being from 75 : 25 to 10 : 90 and the total of (B) and (C) amounting to from about 0.5 to 1.0 moles per mole of glycidyl methacrylate in (A).

4. A storage-stable liquid coating composition adapted for providing a jet black craze-resistant topcoat which comprises a carbon black pigment and as an essential film-forming constituent a copolymer of methyl methacrylatae and glycidyl methacrylate having a methyl methacrylate:glycidyl methacrylate weight ratio of from 85 :15 to 95 : 5 and a relative viscosity of 1.117 to 1.196 modified by heating with butyl acid phosphate and azelaic acid, and a solvent for said copolymer, the mole ratio of butyl acid phosphate to azelaic acid being from 75 : 25 to 10 : 90 and the total of butyl acid phosphate and azelaic acid amounting to from about 0.5 to 1 mole per mole of glycidyl methacrylate in said copolymer.

5. An article having a coating of a composition of claim 1.

6. A process for making a film-forming composition which comprises heating (A) a copolymer of methyl methacrylate and glycidyl methacrylate having a methyl methacrylate:glycidyl methacrylate weight ratio of from 80 : 20 to 98 : 2 in a solvent therefor in the presence of (B) a phosphate from the group consisting of monohydric and dihydric alkyl phosphates, and (C) a saturated aliphatic dicarboxylic acid having from 5 to 20 carbon atoms in which the carboxyl groups are separated by a chain of at least three carbon atoms, the mole ratio of (B) to (C) being from 75 : 25 to 10 : 90 and the total of (B) and (C) amounting to from about 0.5 to 1.0 moles per mole of glycidyl methacrylate in (A).

7. A film-forming resin composition which comprises (A) a copolymer of methyl methacrylate and glycidyl methacrylate having a methyl methacrylate:glycidyl methacrylate weight ratio of from 80 : 20 to 98 : 2 which has been heated in the presence of (B) a phosphate from the group consisting of monohydric and dihydric alkyl phosphates, and (C) a saturated aliphatic dicarboxylic acid having from 5 to 20 carbon atoms in which the carboxyl groups are separated by a chain of at least three carbon atoms, the mole ratio of (B) to (C) being from 75 : 25 to 10 : 90 and the total of (B) and (C) amounting to from about 0.5 to 1.0 moles per mole of glycidyl methacrylate in (A).

References Cited in the file of this patent

UNITED STATES PATENTS

| 2,606,810 | Erickson et al. | Aug. 12, 1952 |
| 2,687,405 | Rothrock et al. | Aug. 24, 1954 |